US012776968B2

(12) United States Patent
Vasseur et al.

(10) Patent No.: US 12,776,968 B2
(45) Date of Patent: Oct. 27, 2026

(54) PROVIDING TRANSPARENCY IN LANGUAGE MODEL-BASED NETWORK TROUBLESHOOTING SYSTEMS

(71) Applicant: Cisco Technology, Inc., San Jose, CA (US)

(72) Inventors: Jean-Philippe Vasseur, Combloux (FR); Grégory Mermoud, Venthône (CH); Pierre-André Savalle, Rueil-Malmaison (FR); Eduard Schornig, Haarlem (NL); Grégoire Magendie, Lamorlaye (FR)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 18/606,187

(22) Filed: Mar. 15, 2024

(65) Prior Publication Data

US 2025/0293957 A1 Sep. 18, 2025

(51) Int. Cl.
*H04L 41/5074* (2022.01)
*H04L 41/16* (2022.01)

(52) U.S. Cl.
CPC .......... *H04L 41/5074* (2013.01); *H04L 41/16* (2013.01)

(58) Field of Classification Search
CPC ............................ H04L 41/16; H04L 41/5074
See application file for complete search history.

(56) References Cited

U.S. PATENT DOCUMENTS 12,086,713 B2 * 9/2024 De Freitas Adiwardana .............. G06N 3/08
2020/0073882 A1 3/2020 Guggilla et al.
2022/0172054 A1 * 6/2022 Karapantelakis ........ G06N 3/08
2022/0309250 A1 * 9/2022 Das ....................... G06F 40/284
2022/0382977 A1 12/2022 Parrish et al.
2023/0062032 A1 3/2023 Wanchoo et al.
2023/0252485 A1 8/2023 Sampath et al.
2023/0417439 A1 * 12/2023 Reichl ...................... F24F 11/32
2024/0163313 A1 * 5/2024 Qian ....................... H04L 63/20
2024/0394600 A1 * 11/2024 Cunningham ....... G06Q 10/107
2024/0419950 A1 * 12/2024 Tong .................... G06N 3/0475
2025/0077551 A1 * 3/2025 Simaria ................... G06F 40/47
2025/0138986 A1 * 5/2025 Bazzo ................... G06F 11/362
2025/0184247 A1 * 6/2025 Tulczyjew .............. H04L 41/16
2025/0217224 A1 * 7/2025 Sundaram ............. G06F 40/284
2025/0274367 A1 * 8/2025 Ananthanarayanan ...................... H04L 43/0823

FOREIGN PATENT DOCUMENTS

WO 2024020674 A1 2/2024

OTHER PUBLICATIONS

Singh A.K., et al., "The Confidence-Competence Gap in Large Language Models: A Cognitive Study", arXiv:2309.16145v1 [cs. CL], Sep. 28, 2023, pp. 1-19.

* cited by examiner

*Primary Examiner* — Kostas J Katsikis
(74) *Attorney, Agent, or Firm* — Merchant & Gould P.C.; Kenneth J. Heywood

(57) ABSTRACT

In one implementation, a device receives an output of a language model-based troubleshooting agent to perform a task with respect to a computer network. The device determines a level of quality of the output. The device generates an instruction for the language model-based troubleshooting agent, when the level of quality of the output is below a threshold. The device requests that the language model-based troubleshooting agent perform the task using the instruction.

20 Claims, 15 Drawing Sheets

800

```
You are a helpful and friendly agent named Elvis designed to troubleshoot a customer network using a Python SDK.
You work in pair with a coding model to retrieve information about the network to answer the following question: {question}.
Your goal is to critic the code produced by the coding model to identify any flaws.

{retrieved entities}

Here is your scratchpad:
'''python
# When you think you can answer the question, call the pre-defined function 'answer', e.g.:
# answer(f'There are {{num_users}} in site {{site_name}}.')
{scratchpad}
'''

Here is the code produced by the coding model:
'''python
{code}
'''

Your task is to identify any flaws in the code produced by the coding model.
Focus on the following aspects, in order of importance:
1. Does the code use information that is not available in the provided schemas or in the scratchpad?
2. Does the code make unfounded assumptions about entities? (e.g., invents a new entity or property, etc.)
3. Is there any flaw in the logic?

Do not penalize the coding model for not checking all boundary conditions (empty lists, etc.).

Use the following format:
'''json
{{
"critic": "<critic of the code>",
"missing_info": ["<list any required information missing from the provided schemas (can be empty)>"],
"is_code_valid": "<(bool) true if the code is safe, false otherwise>",
}}
'''
```

FIG. 8

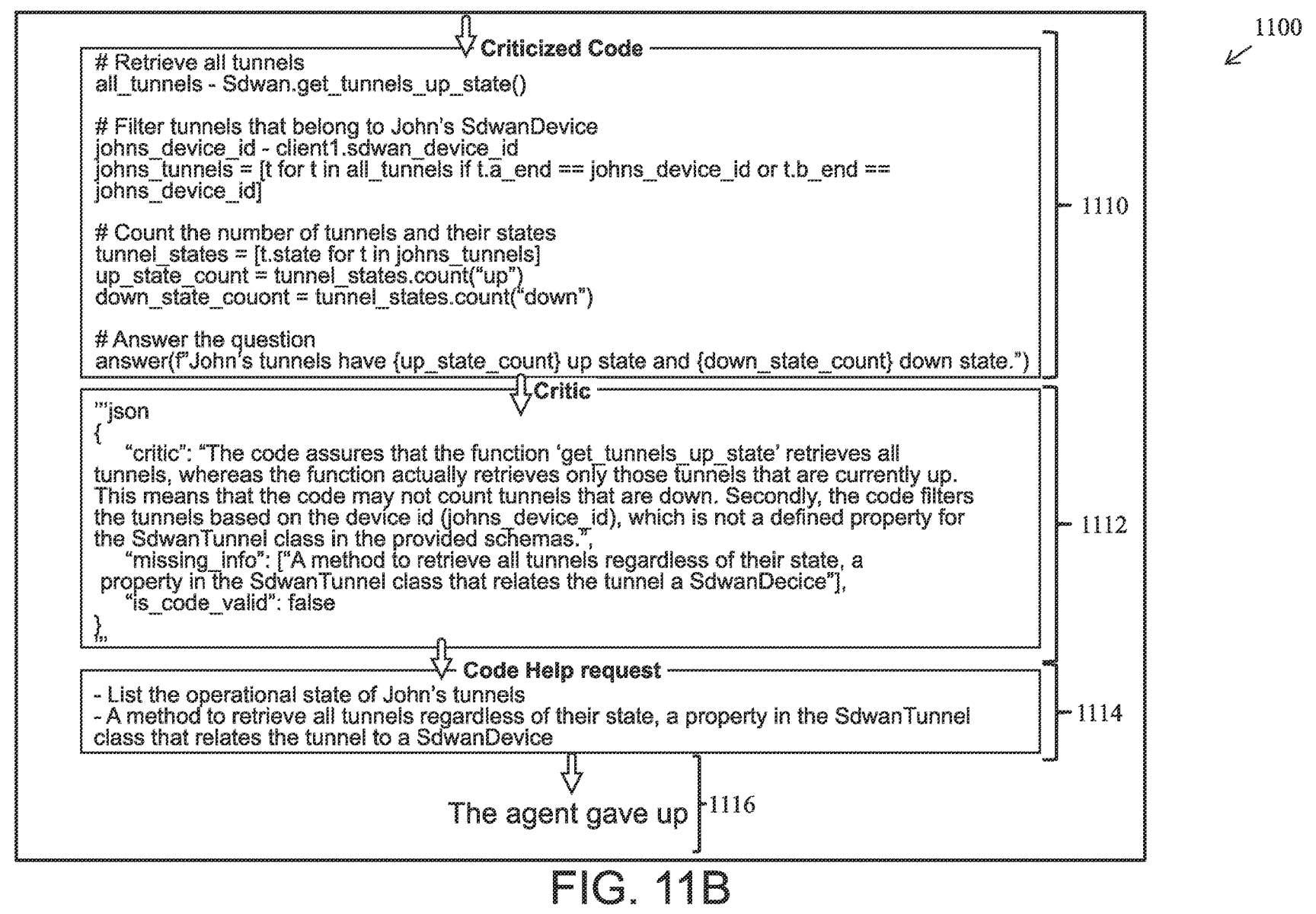

1100

Criticized Code 1110

```
# Retrieve all tunnels
all_tunnels - Sdwan.get_tunnels_up_state()

# Filter tunnels that belong to John's SdwanDevice
johns_device_id - client1.sdwan_device_id
johns_tunnels = [t for t in all_tunnels if t.a_end == johns_device_id or t.b_end ==
johns_device_id]

# Count the number of tunnels and their states
tunnel_states = [t.state for t in johns_tunnels]
up_state_count = tunnel_states.count("up")
down_state_couont = tunnel_states.count("down")

# Answer the question
answer(f"John's tunnels have {up_state_count} up state and {down_state_count} down state.")
```

Critic 1112

```
'''json
{
    "critic": "The code assures that the function 'get_tunnels_up_state' retrieves all
tunnels, whereas the function actually retrieves only those tunnels that are currently up.
This means that the code may not count tunnels that are down. Secondly, the code filters
the tunnels based on the device id (johns_device_id), which is not a defined property for
the SdwanTunnel class in the provided schemas.",
    "missing_info": ["A method to retrieve all tunnels regardless of their state, a
 property in the SdwanTunnel class that relates the tunnel a SdwanDecice"],
    "is_code_valid": false
}'''
```

Code Help request 1114

- List the operational state of John's tunnels
- A method to retrieve all tunnels regardless of their state, a property in the SdwanTunnel class that relates the tunnel to a SdwanDevice The agent gave up 1116

FIG. 11B

PROVIDING TRANSPARENCY IN LANGUAGE MODEL-BASED NETWORK TROUBLESHOOTING SYSTEMS

TECHNICAL FIELD

The present disclosure relates generally to providing transparency in language model-based network troubleshooting systems.

BACKGROUND

The recent breakthroughs in large language models (LLMs), such as ChatGPT and GPT-4, represent new opportunities across a wide spectrum of industries. More specifically, the ability of these models to follow instructions now allow for them to interact with tools (also called plugins) that are able to perform tasks such as searching the web, executing code, etc. In addition, agents can even be written to perform many tasks by chaining multiple calls to one or more LLMs.

While LLM-based agents are now capable of performing tasks in a computer network such as identifying, troubleshooting, and even potentially mitigating against network issues, one of the main challenging in implementing such agents is the lack of transparency with respect to their underlying LLMs. Indeed, the operations of an LLM is often opaque due to its sheer size and complexity. In the context of LLM-based agents for a computer network, this means that the agent typically will perform a number of steps to complete its tasks. However, without any transparency regarding these steps, a user is left to wonder how the agent completed its tasks and whether it did so correctly (e.g., that the LLM did not hallucinate, that the agent was actually able to correct the issue, etc.).

BRIEF SUMMARY OF THE INVENTION

According to one or more implementations of the disclosure, a device receives an output of a language model-based troubleshooting agent to perform a task with respect to a computer network. The device determines a level of quality of the output. The device generates an instruction for the language model-based troubleshooting agent, when the level of quality of the output is below a threshold. The device requests that the language model-based troubleshooting agent perform the task using the instruction.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 8 illustrates an example prompt generated by a first language model when requesting review;

FIGS. 11A-11B illustrates an example showing the halting of a task of a language model-based troubleshooting agent.

DESCRIPTION OF EXAMPLE IMPLEMENTATIONS

Overview

According to one or more implementations of the disclosure, a device receives an output of a language model-based troubleshooting agent to perform a task with respect to a computer network. The device determines a level of quality of the output. The device generates an instruction for the language model-based troubleshooting agent, when the level of quality of the output is below a threshold. The device requests that the language model-based troubleshooting agent perform the task using the instruction.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
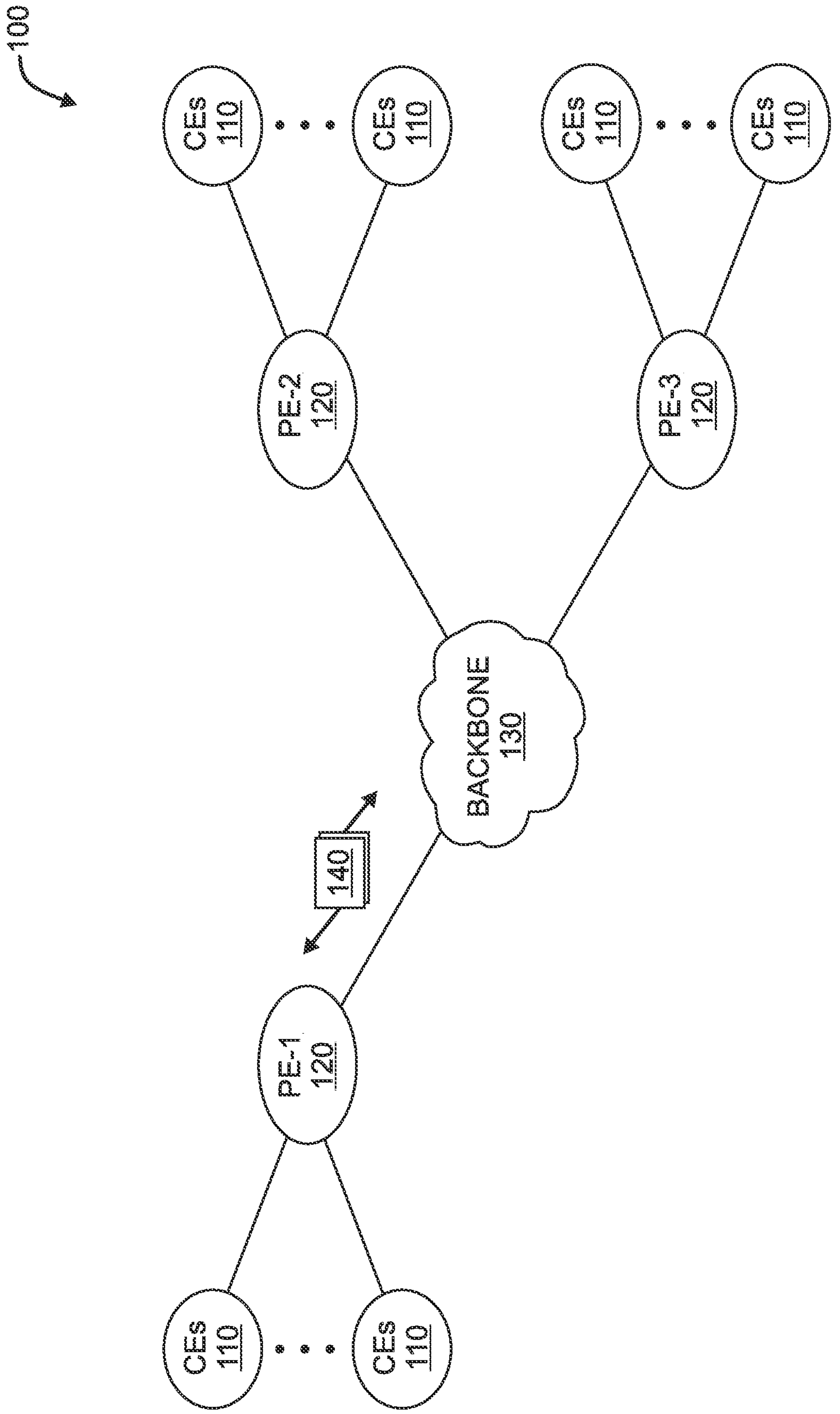
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
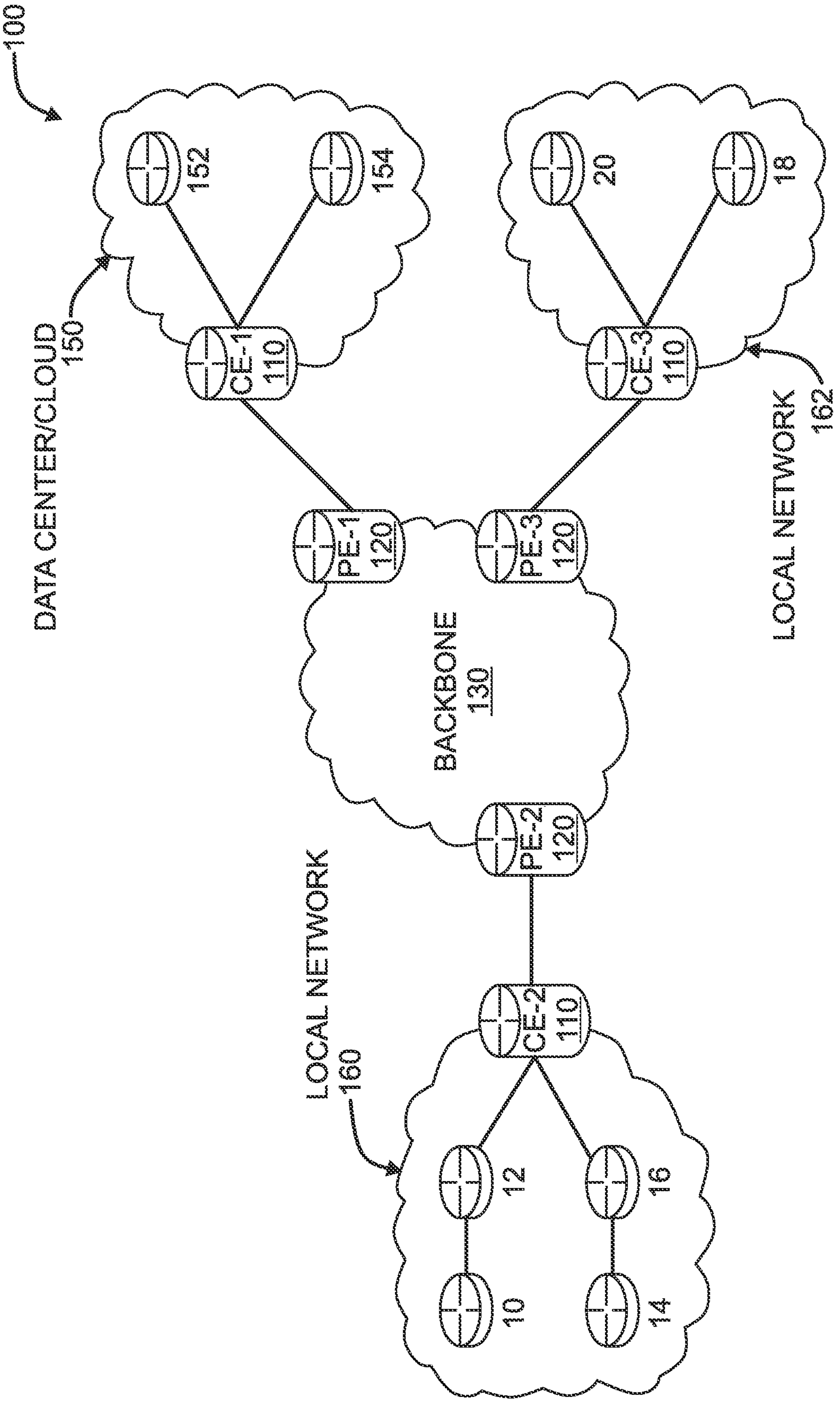

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
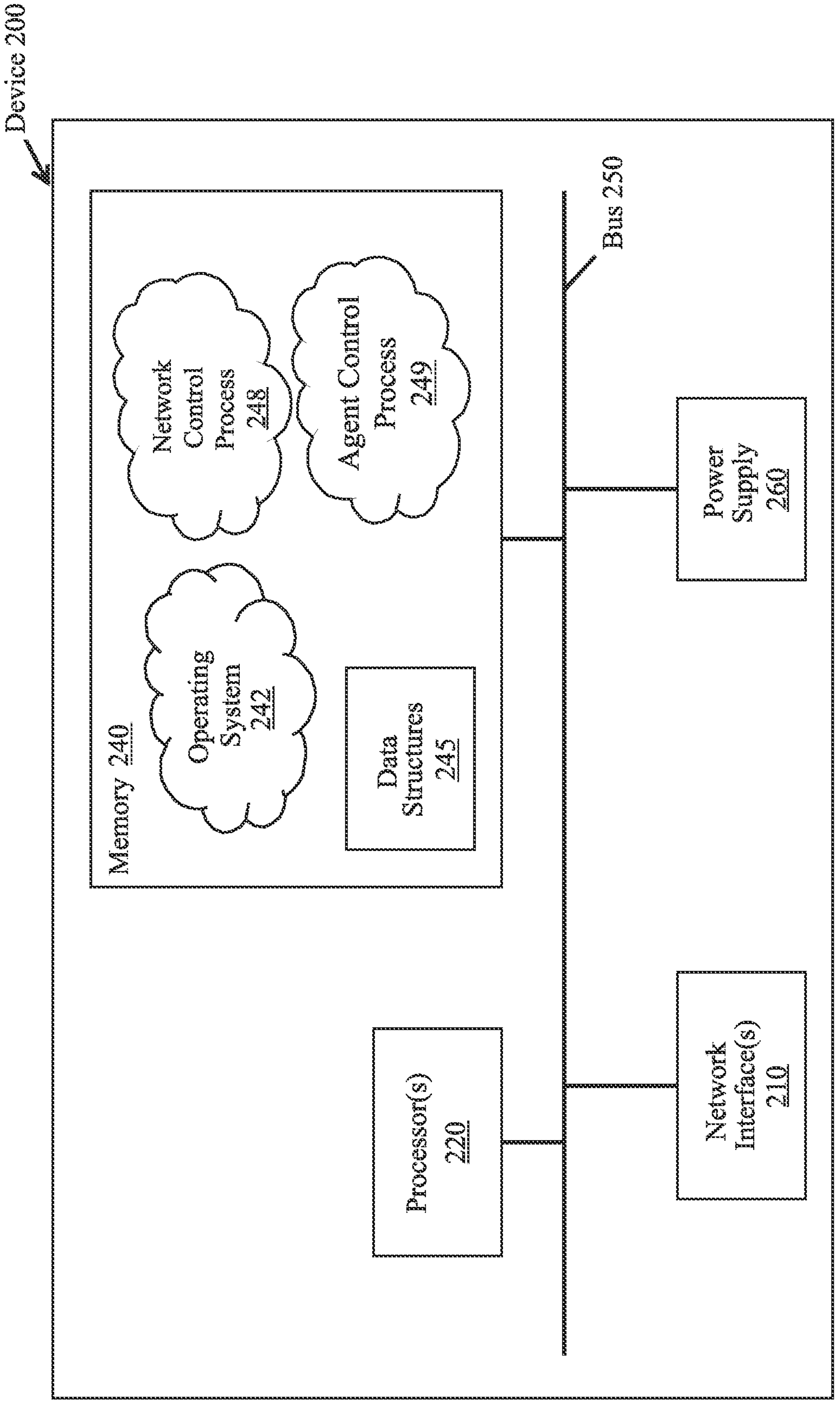
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or an agent control process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, network control process 248 and/or agent control process 249 may include computer executable instructions that, when executed by processor(s) 220, cause device 200 to perform the techniques described herein. To do so, in some implementations, network control process 248 and/or agent control process 249 may utilize machine learning. In various implementations, network control process 248 and/or agent control process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or agent control process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or agent control process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
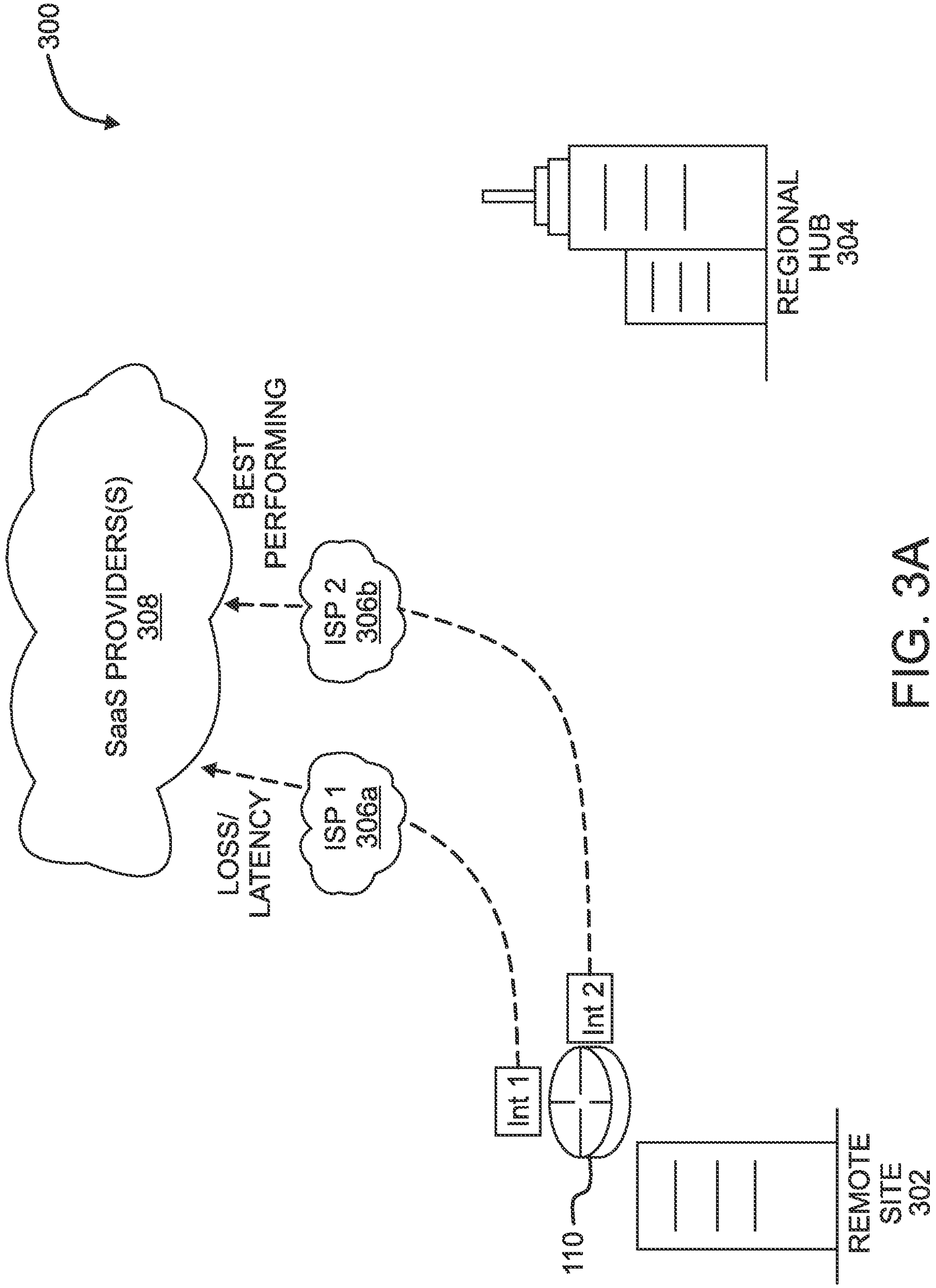
FIGS. 3A-3B illustrate example network deployments.
Figure 3B:
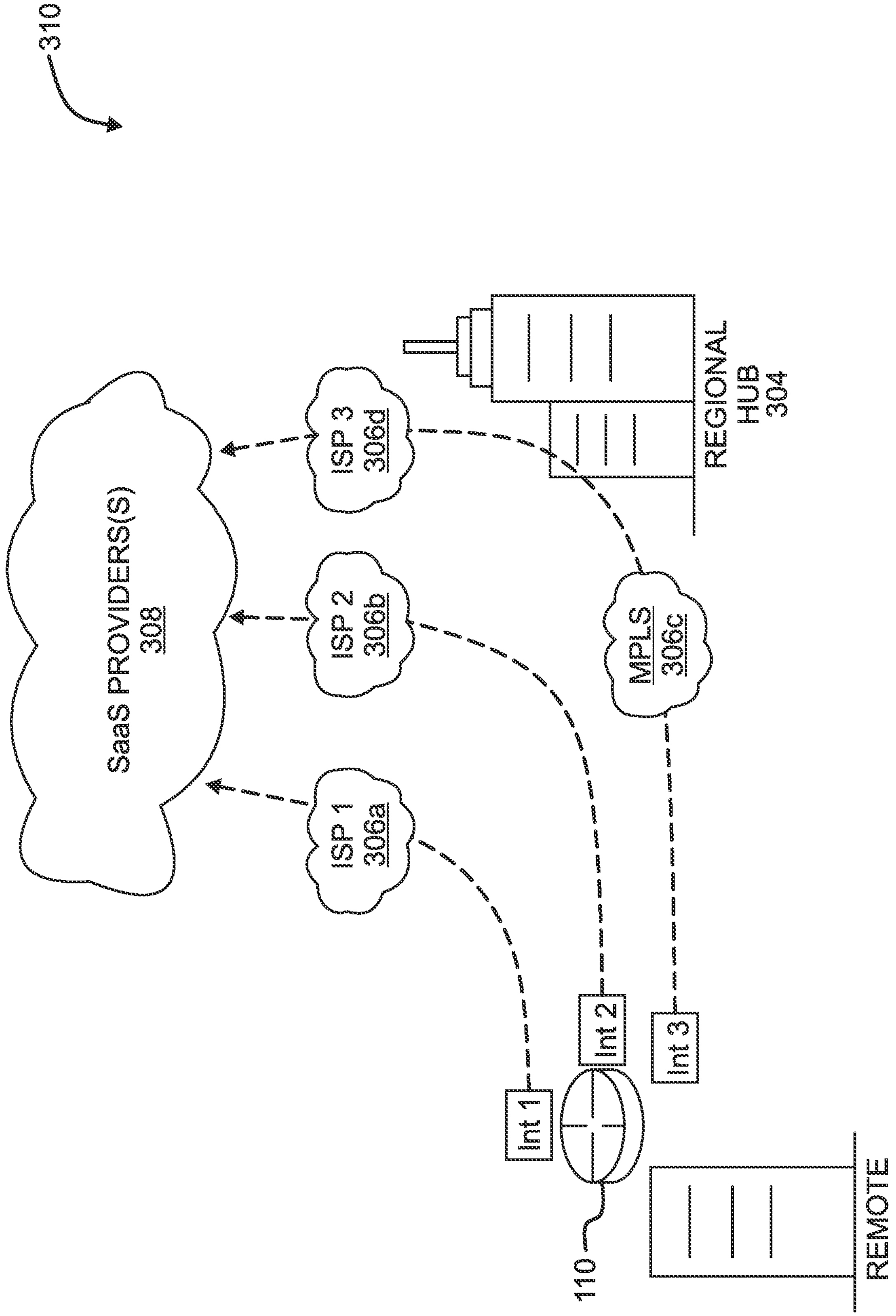

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider (s) 308 via another network, such as a third ISP 306*d*.

Regardless of the specific connectivity configuration for the network, a variety of access technologies may be used (e.g, ADSL, 4G, 5G, etc) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
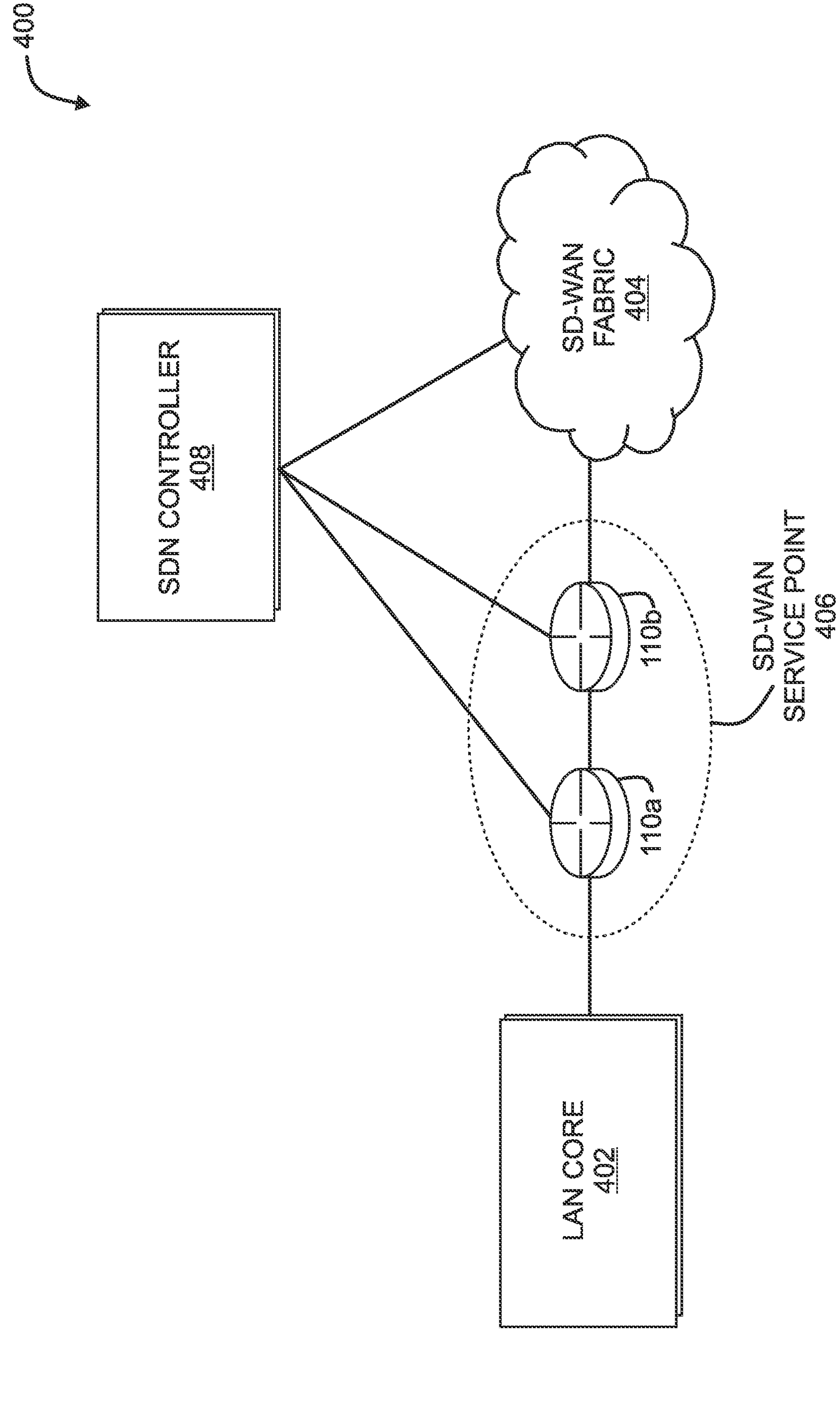
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

- New in-house applications being deployed;
- New SaaS applications being deployed everywhere in the network, hosted by a number of different cloud providers;
- Internet, MPLS, LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

Language Model-Based Ticketing Service

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

One area where LLM-based agents can offer substantial benefits is in the context of technical support for organizations. Traditionally, network troubleshooting in many organizations is structured into multiple tiers (L1, L2, L3) based on the level of expertise and experience of support engineers, with each tier handling increasingly complex issues. When a new support ticket is initiated, it typically follows a tiered process. Initially, the ticket is assigned to an L1 support engineer who conducts basic checks and gathers initial information. If no obvious problem is identified, the ticket is then escalated to an L2 support engineer who collects more detailed data and conducts in-depth troubleshooting.

During the troubleshooting process, the engineer may also refer to past tickets to review the root causes and troubleshooting steps taken for similar issues. While modern ticketing systems can automatically identify related problems and reference them in the new ticket, it remains the responsibility of the support engineer to examine each issue and perform the necessary troubleshooting steps to determine whether the same root cause applies or if the problem is entirely new. If the L2 support engineer is unable to identify the root cause and resolve the issue, it may be further escalated to a higher-level support group.

This entire troubleshooting process can be time-consuming as the issue is transferred between different layers of the support organization, or even different specialized domain experts or teams. This is especially true for complex issues where identifying the root cause is challenging and may require traversing all support tiers. Another drawback of this typical approach is that it can result in wasted time and resources, as multiple engineers may concurrently investigate the same issue. For instance, in the case of network congestion at a large site, multiple users from that site may open support tickets in quick succession. Each ticket may be assigned to a different L1 support engineer, who then independently performs initial debugging tasks before potentially escalating the issue to a higher-level support team. In some cases, the L2 team may eventually recognize the similarity between the new tickets and analyze the collected information to identify common elements (such as the same site, equipment, WAN circuit, etc.), which can significantly narrow down the scope of the investigation. In other cases, these similarities may not be immediately apparent, leading to multiple L2 engineers investigating the same issue, simultaneously.

According to various implementations, upon receiving a new ticket, the system introduced herein automatically generates step-by-step troubleshooting instructions by analyzing past similar issues and executes them in the network environment. This is achieved by leveraging plugins that allow a troubleshooting agent to fetch data via API integrations with network controllers (e.g., DNAC, ACI, SD-WAN) and/or monitoring systems (e.g., Network Management Systems). The primary goals are to either directly identify the root cause of the problem or, when direct identification is not feasible, gather pertinent information such as logs, network context, and performance statistics to facilitate the work of human support engineers. Finally, the system can categorize similar tickets based on common elements, such as site location, WAN gateway, circuit, or log patterns, or based on identified root causes. These groups of tickets are then consolidated into a master issue and escalated to the appropriate technical contacts for remediation.

Illustratively, the techniques described herein may be performed by hardware, software, and/or firmware, such as in accordance with agent control process 249, which may include computer executable instructions executed by the processor 220 (or independent processor of interfaces 210) to perform functions relating to the techniques described herein, such as in conjunction with network control process 248.

Figure 5:
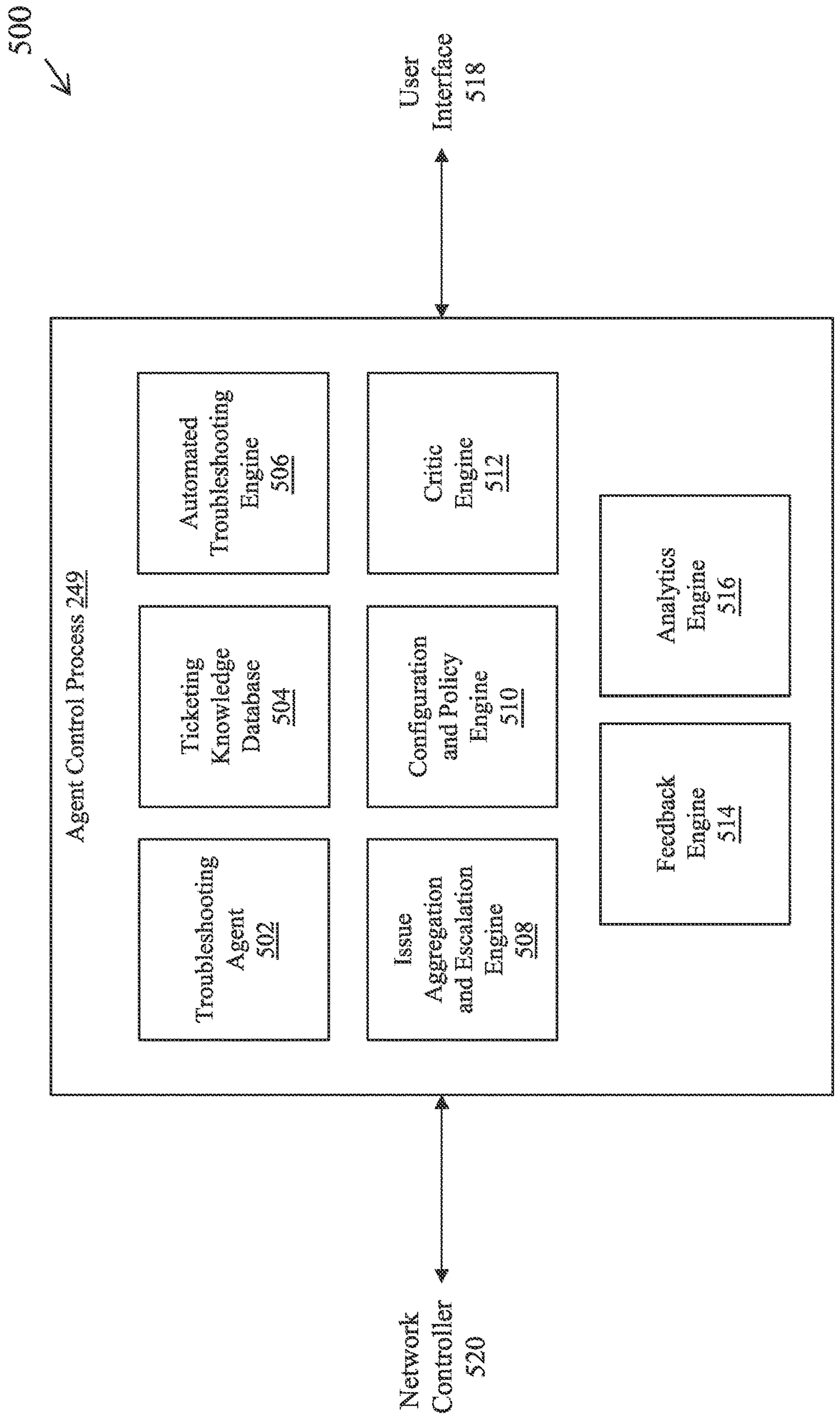
FIG. 5 illustrates an example architecture for a language model-based network troubleshooting system.

FIG. 5 illustrates an example architecture 500 for a language model-based network troubleshooting system, according to various implementations. At the core of architecture 500 is agent control process 249, which may be executed by a controller for a network or another device in communication therewith. For instance, agent control process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, agent control process 249 may interface with a network controller 520, either locally or via a network, such as via one or more application programming interfaces (APIs), etc. In addition, agent control process 249 may communicate with any number of user interfaces, such as user interface 518.

Figure 6:
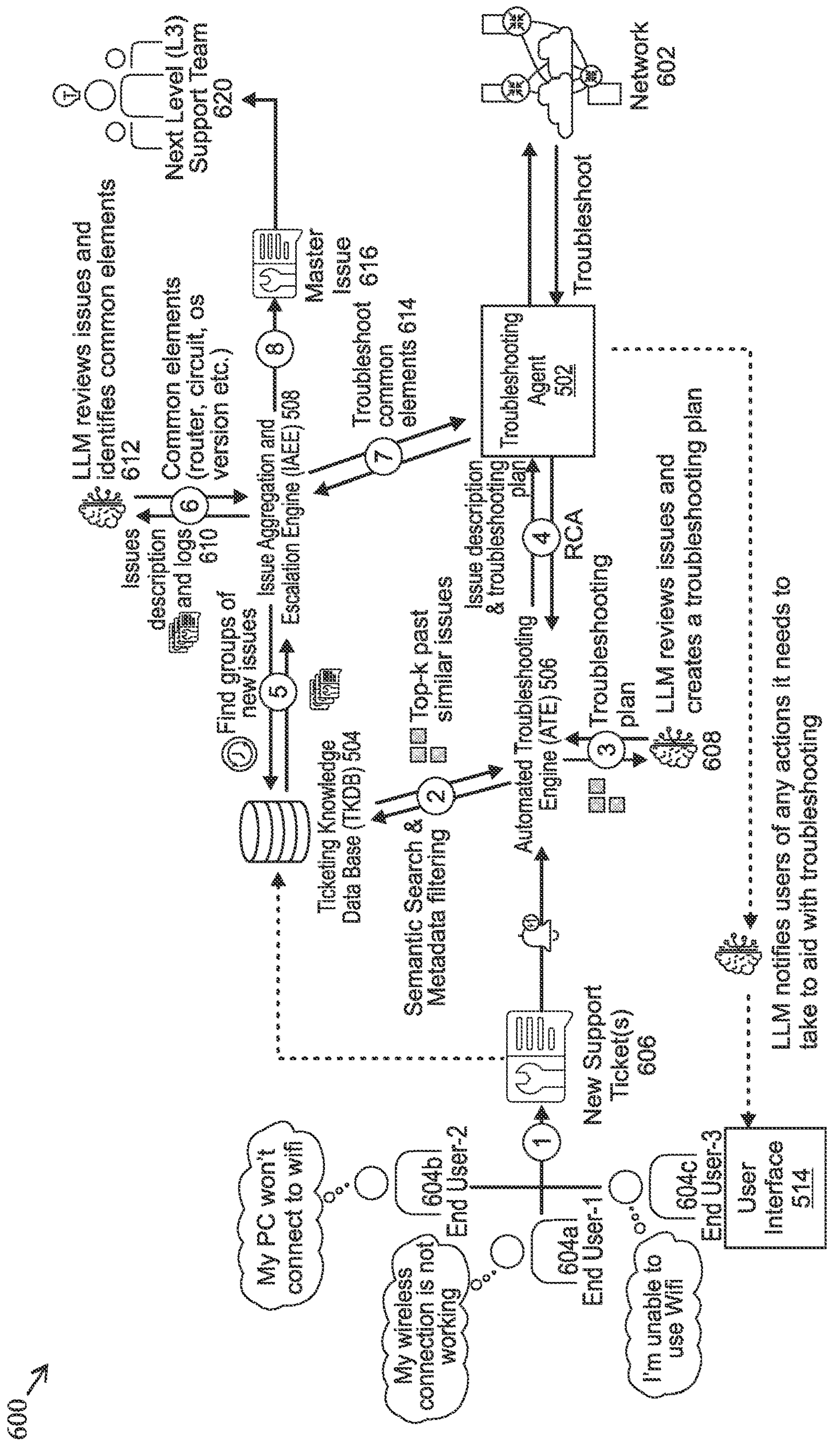
FIG. 6 illustrates an example of the interactions of the components of the architecture in FIG. 5 to provide a language model-based ticketing service.

As shown, agent control process 249 may include any or all of the following components: a troubleshooting agent 502, a ticketing knowledge database 504, an automated troubleshooting engine 506, an issue aggregation and escalation engine 508, a critic engine 512, a feedback engine 514, and/or an analytics engine 516. As would be appreciated, the functionalities of these components may be combined or omitted, as desired. In addition, these components may be implemented on a singular device or in a distributed manner, in which case the combination of executing devices can be viewed as their own singular device for purposes of executing agent control process 249. FIG. 6 illustrates an example 600 of the interactions of the components of architecture 500.

According to various implementations, troubleshooting agent 502 may leverage one or more LLMs to troubleshoot an issue, find the actual root cause for the issue, and/or suggest a set of one or more actions to fix the issue. Let ai denote an action used for troubleshooting an issue I and let Ai denote an action (configuration change) on the network (closed-loop control). In various instances, issue I may be raised by an end user, a set of users, or detected automatically within the network.

The set of actions Ai required to solve the issue I may be determined on-the-fly by the LLM of troubleshooting agent 502, statically determined according to a cookbook for each trajectory made of a set of action ai, or the like. For example, a static cookbook may be used to map a specific ak to set of actions Ak,l. Consider the action ak="Check the priority queue length of a router," a static set of action ak,l may be used to trigger a set of l action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified by troubleshooting agent 502 for issue I is eligible for automated action (e.g., according to a policy), troubleshooting agent 502 may perform any or all of the following:

- Troubleshooting agent 502 retrieves the set of action Ai for the root cause of issue I after activating a timer T (max time to solve the issue)
- Troubleshooting agent 502 may also employ various optimization criterion may be used for solving a given task T. For instance, troubleshooting agent 502 may solve some tasks with objective metrics such as reducing the processing time or improve accuracy even at the risk of involving more steps and tokens (cost). In the context of the techniques herein, the issue criticality may also drive the optimization criteria (e.g., time versus reliability versus cost). In one implementation, the optimization criteria may be unique and decided according to policy and criticality. In another implementation, troubleshooting agent 502 may trigger multiple actions in parallel, each with different optimization criterion. For example, for a given issue I, troubleshooting agent 502 may send a request to a first LLM with a first criteria (e.g., solve as quickly as possible, optimizing time) and send the same request to a second LLM with different optimization criteria (e.g., efficiency). In such a case, troubleshooting agent 502 may use the reply to the first request (set of resolution action Ai) to quickly fix the network, followed by using the second set of actions to optimize the resolution of the issue. Note that both requests may not overlap in terms of closed-loop actions, as well.

In other words, during execution, troubleshooting agent 502 may take questions as input, runs one or more steps that can consist in calling an LLM, or retrieve data from external systems such as network controllers and monitoring systems, and produces an answer as output. To do so, troubleshooting agent 502 may rely on external APIs to obtain data required to perform troubleshooting and monitoring actions.

In various implementations ticketing knowledge database 504 may take the form of a vector database or other database that has the role of storing the text contents of support tickets as vector embeddings and facilitating semantic searches of said ticket history. For instance, ticketing knowledge database 504 may leverage a vector database such as Chroma or Pinecone to achieve this role and leverage either SaaS based embedding services such as OpenAI or local open-source embedding models to vectorize the ticket contents. Besides the vector embeddings, for each ticket, ticketing knowledge database 504 may also store additional information as metadata, such as any or all of the following:

- State: Unassigned, Open, Closed (Resolved).
- Issue category: Poor connectivity, No connectivity etc.
- Technology domain: Security, Wired Access, Wireless Access, etc.
- End user satisfaction: A reflection of how satisfied the user was with the support interaction usually as a 1 (low) to 5 (high) score.
- Ticket key performance indicators (KPIs): Metrics such as time to resolution, that measure the total time taken to resolve the tickets or any other KPIs relevant for the specific support organization.

In various implementations, automated troubleshooting engine 506 may perform several tasks, when it receives a new support ticket:

In a first step, it queries ticketing knowledge database 504 for similar issues using a combination of semantic search and metadata filters. Automated troubleshooting engine 506 may identify relevant past issues based on a certain threshold of similarity, however it may use additional criteria such as user satisfaction score to narrow down the scope.

In a second phase, automated troubleshooting engine 506 may sends the ticket contents to an LLM (e.g., the LLM of troubleshooting agent 502) specifically tasked with extracting the troubleshooting steps performed in each of the identified similar tickets and compose a step-by-step troubleshooting plan. Based on the available LLM context size, this operation may be performed as one step, with all past tickets being included in the same LLM prompt or using multiple steps. In this second instance, troubleshooting steps for each ticket are extracted separately followed by a second query to the LLM which is asked to combine all the steps in a troubleshooting plan.

The resulting troubleshooting plan may resemble an inverted tree structure, with common steps that are executed universally at the top, such as identifying the site to which the user is connected, determining the connection type, and assessing the overall health status. These initial steps then branch out into several trajectories, each corresponding to potential root causes or specific troubleshooting paths. For example, these branches might involve verifying the health of the Wireless Access Point (AP), checking the uptime of the upstream switch, or assessing the load on the WAN connection, among other possibilities.

Furthermore, within each branch of the troubleshooting tree, there may exist two distinct types of steps:

1. Autonomous steps: these are sets of troubleshooting steps or actions that troubleshooting agent 502 can execute directly without requiring user intervention.
2. User Steps: these steps are actions that are part of the troubleshooting plan which need to be carried out by the end-users themselves. These actions might include actions like rebooting a host device or software client, modifying local configuration parameters, or collecting specific logs or information.

Next, automated troubleshooting engine 506 may send the troubleshooting plan to troubleshooting agent 502 that can interact with network controllers and monitoring systems to execute it and identify the root cause of the issue. To reduce the burden on the end user, troubleshooting agent 502 may be directed to initially explore the branches within the troubleshooting plan that exclusively consist of autonomous steps. This approach aims to identify the root cause without requiring any direct involvement from the end user. If, however, no root cause can be determined following the exploration of these autonomous branches, troubleshooting agent 502 may proceed to investigate branches that necessitate user interaction.

In such cases where user interaction is required, troubleshooting agent 502 may engage a user-facing LLM with the purpose of communicating with the end user. For instance, it may request that the end user perform certain actions, provide additional clarifications, or submit logs, thereby facilitating the troubleshooting process.

Upon completion of all the troubleshooting steps, two potential outcomes are possible:

Successful root cause identification: troubleshooting agent 502 successfully identifies the root cause of the issue. Automated troubleshooting engine 506 may engage with a system that aims to leverage automated self-healing capabilities to rectify the issue without human intervention. Alternatively, the root cause may be documented in the ticket and forwarded to a human support agent for remediation.

No root cause is identified: the second potential scenario arises when troubleshooting agent 502 is unable to successfully identify the root cause. In one embodiment, automated troubleshooting engine 506 handles this situation by initiating the entire process again, starting with a new query to the ticketing knowledge database 504 for a new set of similar issues. Additional filters may be specified to refine the search, excluding issues that match root causes (RCAs) that have already been ruled out. This process can be iterated multiple times, continuing until either a root cause is either discovered, or a predefined maximum number of attempts is reached. Alternatively, in a second embodiment, automated troubleshooting engine 506 may opt to utilize a system that facilitates the request for assistance from a human Subject Matter Expert (SME) when automated troubleshooting proves inconclusive.

In various implementations, issue aggregation and escalation engine 508 assumes the responsibility of continuously monitoring ticketing queues for the discovery of similar issues. Its primary function is to automatically aggregate similar issues into master tickets that can be quickly escalated to higher-level support teams.

Issue aggregation and escalation engine 508 may routinely query ticketing knowledge database 504 for tickets that are in an open state and employs clustering techniques, such as K-means clustering or Hierarchical Clustering, to group similar tickets together. These clusters represent sets of tickets that share common characteristics or problem descriptions.

When a new cluster of issues is identified, issue aggregation and escalation engine 508 may use an LLM to analyze the network information already collected with the tasks of identifying common network elements, such as a shared site, device, or circuit. For example, it may discover that all users reporting wireless issues are connected to the same site and wireless access point (AP). Additionally, it can identify common user environment elements, such as software versions, device types, or specific application issues. For instance, it might find that users with a particular device type are experiencing connectivity problems with the wireless network. In yet another instance, issue aggregation and escalation engine 508 may identify a combination of both network and user common elements such as all users with a specific software version have issues authenticating when using APs connected to a certain wireless controller (WLC).

If no root cause was pinpointed during earlier troubleshooting stages (e.g., by automated troubleshooting engine 506), issue aggregation and escalation engine 508 may employ troubleshooting agent 502 once again, this time the focus is on performing more targeted troubleshooting of the common elements identified. For instance, it may investigate the health of a specific router, or a network interface associated with the common issues.

Finally, issue aggregation and escalation engine 508 may document its findings, including the common elements it identified and any additional troubleshooting results, into a master ticket. This master ticket is then escalated to the next level of support teams for resolution. Moreover, as new support tickets matching the same master issue are generated, they are automatically cross-referenced to streamline the resolution process. New support tickets matching the same master issue are automatically referenced as they come in.

The fourth component of the solution is configuration and policy engine 510 which allows a support organization administrator to configure a set of constraints on the Virtual Assistant operations. To this end, several constraints can be configured, such as any or all of the following:

Issues of interest: which support queues and categories of issues for which the system should be engaged. For example, the agent may be asked to engage for wireless campus issues but not data center related ones.

Budget: what is the maximum token number (or cost) the agent can spend to perform the automated troubleshooting?

Past issue count—count of past issues to be used for deriving the troubleshooting plan by automated troubleshooting engine 506.

Escalation cluster size: the minimum number of similar issues that issue aggregation and escalation engine 508 needs to identify before opening a master issue and escalating to the next level of support.

FIG. 6 illustrates an example 600 of the interactions of the components of the architecture in FIG. 5. As shown, assume that there are various end users in a network 602, such as end user 604*a*, end user 604*b*, and end user 604*c*. First, one or more of these users may open one or more new support tickets 606, such as via a user interface 518, which is sent to automated troubleshooting engine 506, as shown at (1).

In turn, automated troubleshooting engine 506 may perform a semantic search (and metadata filtering) of ticketing knowledge database 504 for the one or more new support tickets 606, as shown at (2). Then, automated troubleshooting engine 506 may leverage an LLM 608 to devise a troubleshooting plan, based on the k-number of past similar issues to those raised in the one or more new support tickets 606, as shown at (3). Automated troubleshooting engine 506 then sends the issue description and troubleshooting plan to troubleshooting agent 502, which uses this information to perform troubleshooting in network 602 and returns the identified root causes (RCAs) back to automated troubleshooting engine 506, at (4). Troubleshooting agent 502 or automated troubleshooting engine 506 may then formulate a notification of any actions that users 604 need to take to resolve the issue.

In cases when ticketing knowledge database 504 finds a group of new issues, at (5), it may notify issue aggregation and escalation engine 508. In turn, issue aggregation and escalation engine 508 may leverage an LLM 612 (e.g., the LLM of agent 502) to identify common elements (e.g., router, circuit, SO version, etc.) among the issue descriptions and logs 610, at (6). Issue aggregation and escalation engine 508 may then send ask troubleshooting agent 502 to troubleshoot the common elements 614, at (7). In addition, issue aggregation and escalation engine 508 may also aggregate tickets into a master issue 616 by seeking review from an L3 support team 620, at (8).

Providing Transparency in Language Model-Based Network Troubleshooting Systems Unfortunately, some of the major issues with LLMs is their opaqueness, lack of reliability, and sensitivity to minor input changes. Indeed, LLMs are often opaque due to their sheer size and complexity. While individual components of complex artificial intelligence architectures like transformers are understood, the system as a whole remains unpredictable, akin to a "black box." This contrasts with more transparent machine learning approaches such as decision trees. Consequently, operating LLMs has become more of an art than a science, relying on trial-and-error strategies to improve outcomes. Despite their lack of reliability and transparency, LLMs are extensively used due to their practical utility, as evidenced by their rapid adoption by millions of users. They serve numerous applications effectively, despite known issues like hallucination.

Although their reliability will continue to improve, LLMs do hallucinate, and a number of techniques are being designed to help mitigate such an undesirable effect such as the following, among others: improving accuracy by using more accurate models that are trained with a large amount of quality training data, improving prompting strategies, reducing the model temperature, accessing the decoding loop for beam search, and applying constraints to token generation.

A very desirable property of any artificial intelligence system, such as the one shown in FIG. 6, is its interpretability. In other words, how can one understand what led troubleshooting agent 502 to a specific outcome? Some algorithms are highly interpretable (e.g., decision trees), while highly complex architectures such as transformers are fairly opaque. One potential way would be for troubleshooting agent 502 to report its progress while solving a task. For instance, troubleshooting agent 502 may report intermediate updates to a user while solving complex tasks. While reasoning, the agent may provide transparency, not by explaining every inference step (which may not be interpretable), but by listing every troubleshooting step and its associated outcome (subtask summary). The outcome might not be correct if the system hallucinates, but providing intermediate steps allows an expert to save time and avoid repeating tasks completed by the system.

Generally, transparency relates to the ability of the system to provide visibility into the operations completed while answering a complex question or performing another such task. In the previous example, troubleshooting agent 502 might encounter issues while executing the plan proposed by the LLM, possibly due to a bug in the code for a given step or a step that does not make sense. In such cases, the system could achieve transparency by summarizing each step and their respective outcomes, although it may not explain why and how such steps were accomplished.

A second property, Epistemic Humility, refers to the ability of the model to determine a level of certainty in its answers, a capability missing in most LLMs that confidently generate outcomes, sometimes completely hallucinated. Designing a metric reflecting the confidence level of the system during task accomplishment could be useful. Multiple metrics, or even proxy metrics directly correlated with the probability of success in successful and failed step sequences, could be employed. Epistemic humility may then allow the system/model to halt a task, should it determine a level of confidence/output quality is below a minimal threshold, which could itself become a key parameter of the overall performance of the system.

According to various implementations, the techniques herein allow for a dynamic assessment of the quality of the answer or other output of the agent, such as determined by a second LLM. In some instances, the second LLM may be able to provide a critique of the output and make suggestions that will improve the quality or explicitly suggest that the system to stop the process and request help from a subject matter expert (SME). Such a system would then both improve the quality of the answer, as well as improve transparency by stopping a process and request explicit help, when needed.

Specifically, according to various implementations, a device receives an output of a language model-based troubleshooting agent to perform a task with respect to a computer network. The device determines a level of quality of the output. The device generates an instruction for the language model-based troubleshooting agent, when the level of quality of the output is below a threshold. The device requests that the language model-based troubleshooting agent perform the task using the instruction.

In various implementations, critic engine 512 in FIG. 5 may be in charge of assessing the quality of the output troubleshooting agent 502 (e.g., via automated troubleshooting engine 506). The role of the critics is twofold:

1. Review the quality of the output of troubleshooting agent 502.
2. Determine whether the task should be interrupted to request SME assistance, in order to mitigate the risk of the output being of poor quality. In other words, the "quality" of the output may correspond to the system's confidence in the output being able to complete the task being below a threshold. In such a case, it may be preferable to transparently stop performance of the task and request SME feedback to continue the process, rather than providing a poor quality output or even hallucinations.

In a first embodiment, critic engine 512 may make use of a second language model, such as a different LLM than that used by troubleshooting agent 502 to produce the output. The second LLM could, for instance, be a SaaS-based using some APIs (e.g., GPT-4) or even a locally trained OSS model such as Orca2, Mixtral7B, or others. In some cases, critic engine 512 could even employ multiple models to act as critics for the outcome, each specialized for specific tasks such as writing code or performing multi-step reasoning. In such a case, critic engine 512 may send the output of troubleshooting agent 502 to the critic(s).

Figure 7:
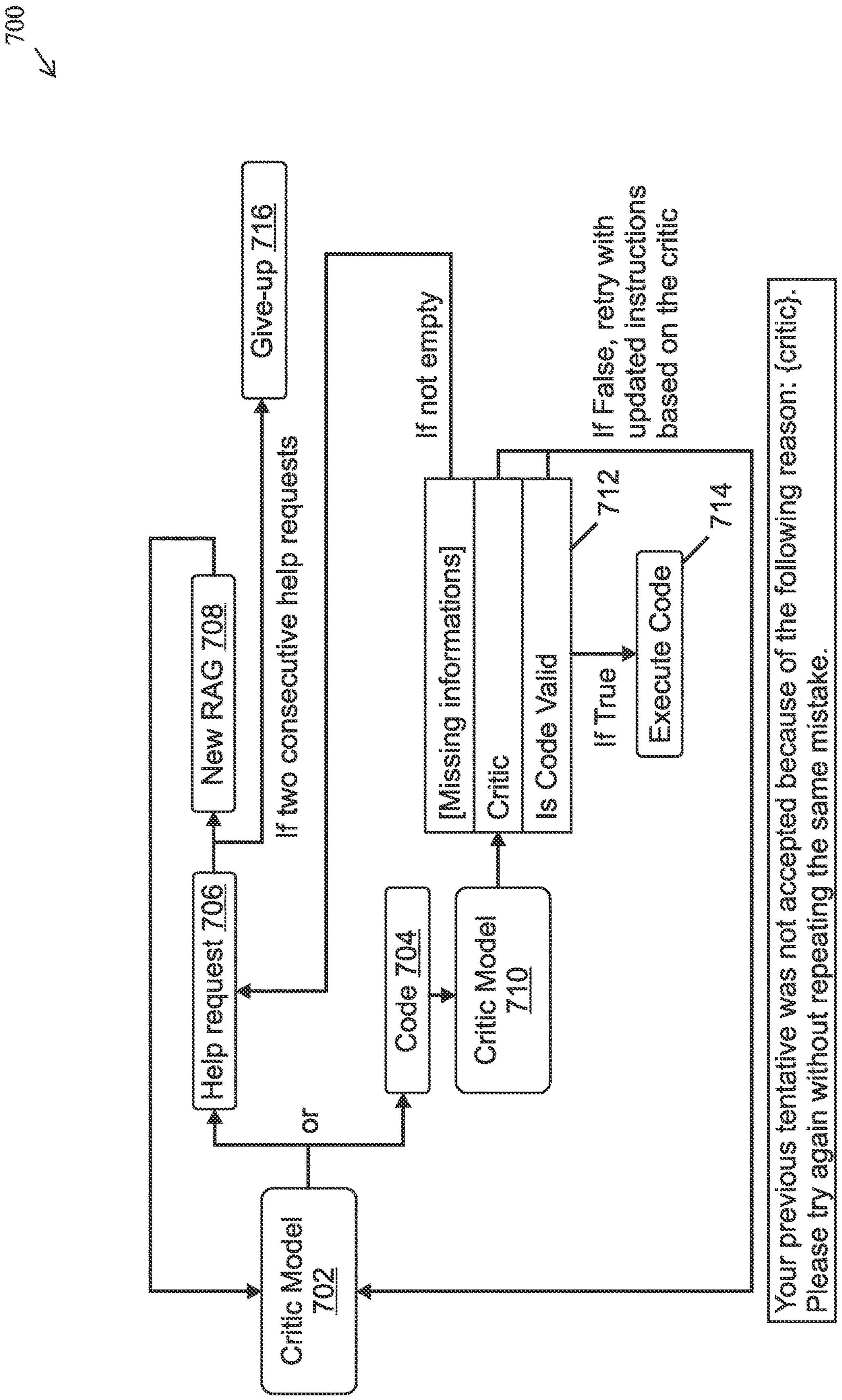
FIG. 7 illustrates an example architecture for providing transparency in a language model-based network troubleshooting system.

FIG. 7 illustrates an example architecture 700 for providing transparency in a language model-based network troubleshooting system. In various implementations, architecture 700 may be used to implement critic engine 512. For instance, critic engine 512 may include a critic model 710 configured to critique the output of troubleshooting agent 502.

As shown, assume that troubleshooting agent 502 leverages a code model 702 (e.g., an LLM or other language model) to generate code 704 as an output. For instance, code 704 may include code that, when executed, performs a task, or a subtask, that troubleshooting agent 502 is asked to perform (e.g., code 704 may make an API call to networking equipment to retrieve certain information, code 704 may include command line interface (CLI) commands, etc.). In turn, critic engine 512 may use critic model 710 to assess the quality of code 704. For instance, critic model 710 may assess code 704 to identify syntax errors, portions that will not achieve the desired task, etc., to produce results 712. As shown, results 712 could indicate any or all of the following:

- That 704 is valid (i.e., its quality exceeds some threshold), in which critic engine 512 may provide an indication 714 that code 704 has been validated and is cleared for execution (e.g., by troubleshooting agent 502).
- A critique of code 704. For instance, code 704 may take the form of an instruction that critic engine 512 passes back to code model 702 and troubleshooting agent 502 to perform the task in accordance with the instruction. In some embodiments, the instruction may take the form of updated code that troubleshooting agent 502 should execute instead of code 704 to perform its task or subtask. In other cases, the instruction may take the form of corrections (e.g., a revised prompt for code model 702) that corrects any issues in code 704.
- Missing information. For instance, results 712 may indicate that a call made by code 704 is missing a parameter or other information that is needed to execute correctly.

As shown, another potential function of critic engine 512 is to seek help from an expert user, when the quality of code 704 (or other output of troubleshooting agent 502) is below an acceptable threshold. For instance, if results 712 indicates that there is missing information, critic engine 512 may send a help request 706 to a user interface (e.g., user interface 518) requesting that an expert user aid in the review, and potential correction, of code 704. In some instances, code model 702 used by troubleshooting agent 502 to generate code 704 may itself send help request 706 for SME assistance, rather than critic engine 512.

In response to help request 706, the SME may provide additional information to the system, that allows code model 702 to re-attempt to generate code 704 correctly. For instance, help request 706 may ask that the SME provide sample code to perform a certain task or subtask, a missing schema needed to correct code 704, API information, etc. In some instances, any information that the SME provides may be stored in a new retrieval augmented generation (RAG) entry for use by code model 702.

As shown, architecture 700 may repeat its processing up to a defined number of times, when the quality of the output of troubleshooting agent 502 remains below an acceptable threshold. For instance, if the system provides automated critiques of code 704 and/or received SME feedback a certain amount of times, the system may finally opt to give up at block 712. For instance, if the system asked the SME for help twice, but was still unable to generate an output of suitable quality to perform the desired task, the system may give up and notify a user that it was unable to perform the task.

FIG. 8 illustrates an example prompt 800 generated by a first language model when requesting review. As shown, troubleshooting agent 502 may generate prompt 800 to request critical review by critic engine 512. Here, prompt 800 includes a listing of the original question/query sent to troubleshooting agent 502 by a user, the list of network entities retrieved by troubleshooting agent 502, scratchpad information, code generated by troubleshooting agent 502, and a request to critic engine 512 asking it to identify any flaws in the code using a specified format. In turn, critic engine 512 may use prompt 800 as input to its own model (e.g., a second LLM), to assess the quality of the code produced by troubleshooting agent 502.

Figure 9:
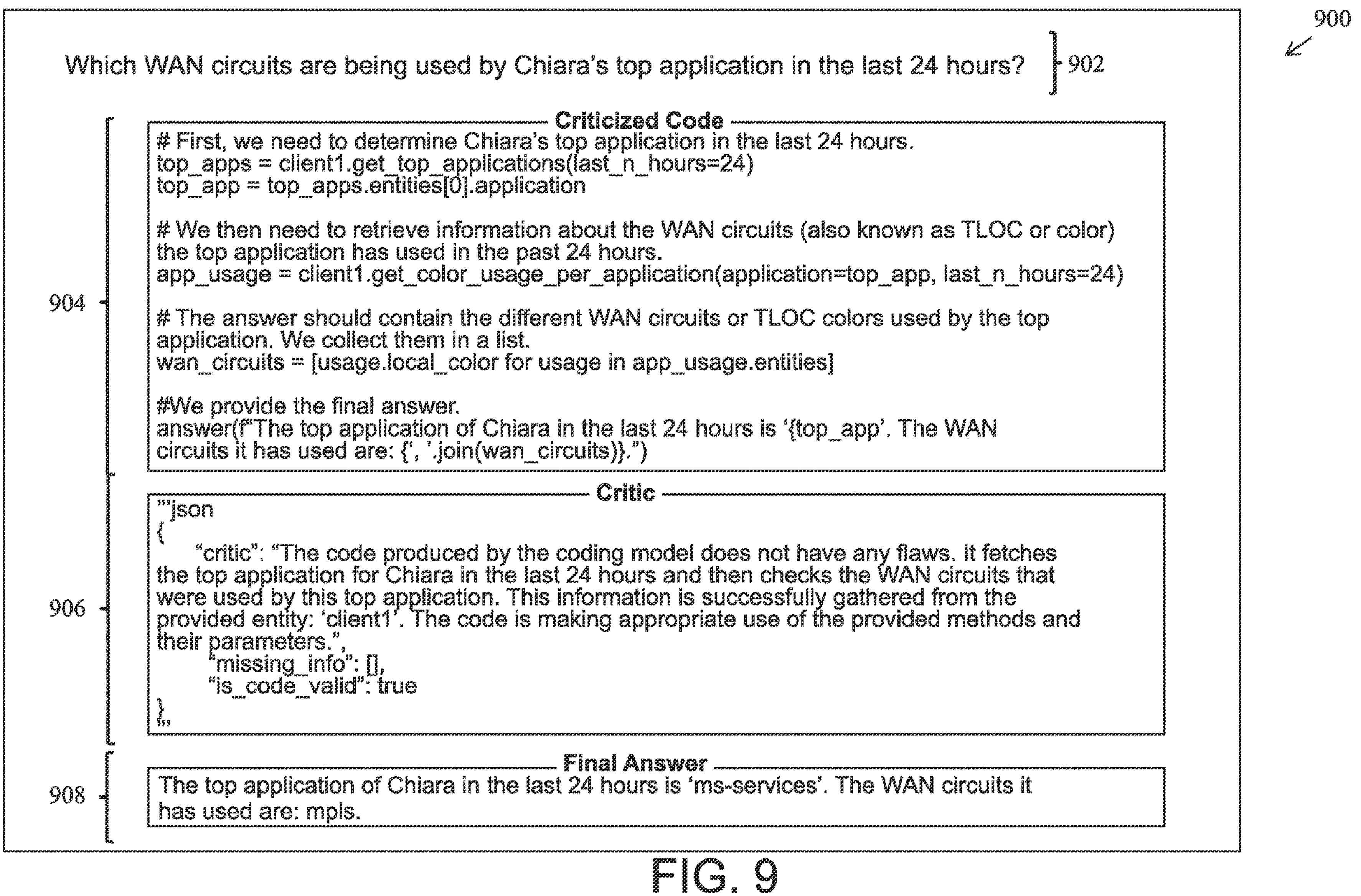
FIG. 9 illustrates an example showing the validation of an output of a language model-based troubleshooting agent.

FIG. 9 illustrates an example 900 showing the validation of an output of a language model-based troubleshooting agent. As shown, a prototype system was implemented using the techniques herein, resulting in the text in example 900 being provided to a user interface, to provide transparency to the user regarding the operation of the system. Here, the initial query 902 to the system asked which WAN circuits are being used by Chiara's top application in the last 24 hours. In response, the system generated code 904 to perform the task (i.e., to answer initial query 902). The system then asked its critic engine to assess code 904, resulting in critical response 906. Here, the critic model determined that code 904 is of high quality and did not have any flaws. In turn, the system notified its troubleshooting agent with critical response 906, causing it to execute code 904, to produce final answer 908 for initial query 902.

Figure 10:
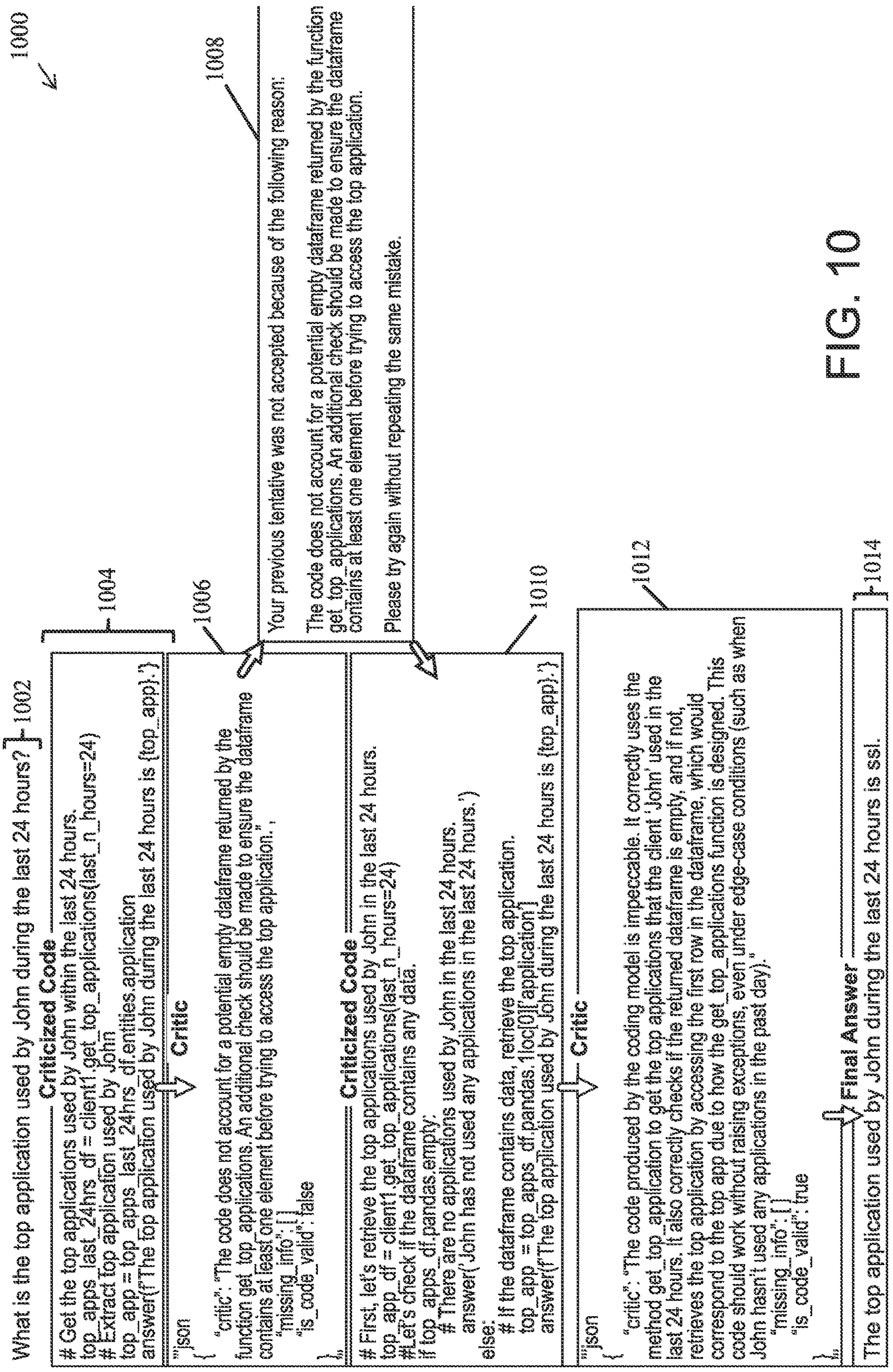
FIG. 10 illustrates an example showing correction of an output of a language model-based troubleshooting agent.

In contrast, FIG. 10 illustrates an example 1000 from the prototype system showing correction of an output of a language model-based troubleshooting agent. Here, query 1002 asked what the top application used by John during the last 24 hours was. The troubleshooting agent then generated code 1004 and asked the critic engine to assess its quality, resulting in critical response 1006. As shown, critical response 1006 indicates that code 1004 was of low quality because it does not account for a potential empty dataframe returned by the function get_top_applications. In turn, the critic engine sent a prompt 1008 back to the troubleshooting agent, indicating that critical response 1006 could not be validated because of missing information.

In response to prompt 1008, the troubleshooting agent then used its LLM to generate new code 1010 for review by the critic engine. Here, the critic engine returned critical response 1012, indicating that new code 1010 is of acceptable quality and without error. This then triggered the troubleshooting agent to execute new code 1010, to generate final response 1014. As can be seen, final answer 1014 indicates that ssl is the top application used by user John during the past 24 hours.

Figure 11A:
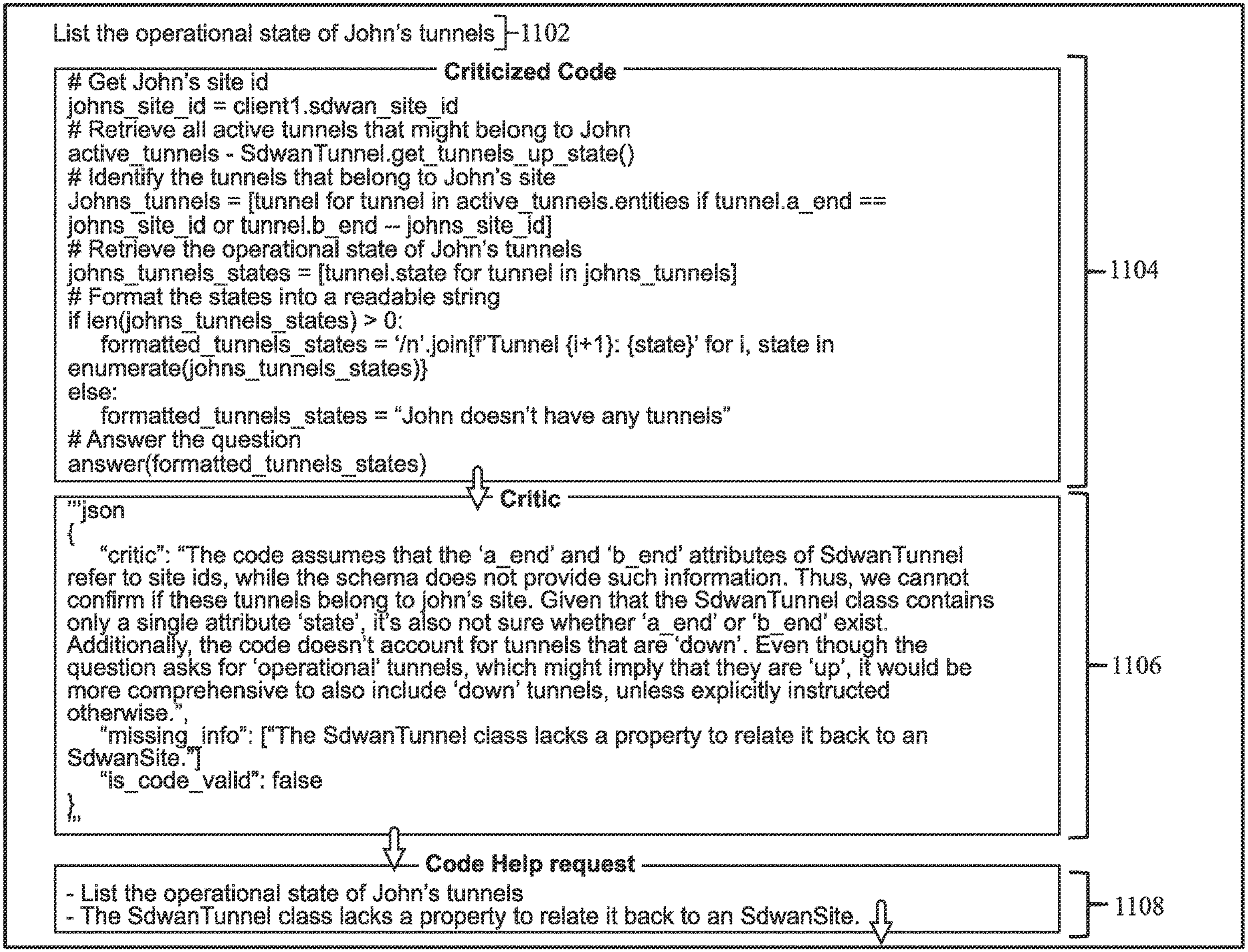

FIGS. 11A-11B illustrates an example 1100 showing the halting of a task of a language model-based troubleshooting agent. As shown in FIG. 11A, the prototype system was asked to evaluate query 1102, which asked for the operational state of John's tunnels. The troubleshooting agent then generated code 1104 and asked for criticism from the critic engine. Here, critical response 1106 indicates that code 1104 is not valid/of low quality. In this instance, the prototype system issued a help request 1108 to request that an SME help fix code 1104 (e.g., to make it list the operational state of John's tunnel and fix a lack of relationship between the SdwanClass and an SdwanSite.

In FIG. 11B, after receiving SME feedback, the troubleshooting agent generated new code 1110, which the critic engine assessed to produce critical response 1112. Unfortunately, new code 1110 again failed validation, leading the prototype system to send a new help request 1114 for SME feedback. Again, the SME was unable to correct the output code, leading the system to give up at step 1116, meaning that it was unable to output code suitable to answer query 1102.

Referring again to FIG. 5, critic engine 512 may alternatively leverage a statistical model, in further implementations. Such an approach would aim to produce a metric (number) reflecting the level of confidence of the system related to its output. For instance, the statistical model could be trained as a regressor using as input the nature of the task.

In various implementations, feedback engine 514 may be responsible for obtaining SME feedback via user interface 518, when the quality of the output of troubleshooting agent 502 is below a threshold (e.g., cannot be validated by critic engine 512). In some instances, the LLM of troubleshooting agent 502 may directly trigger feedback engine 514. In other instances, critic engine 512 may instead call feedback engine 514. In either case, troubleshooting agent 502 may halt performance of its task or subtask until feedback engine 514 is able to obtain SME feedback. For instance, this can be due to the output of troubleshooting agent 502 missing information or because it hallucinates or got 'lost' during the process of solving the task.

By way of example, feedback engine 514 may provide any or all of the following information to user interface 518 for review by the SME:

- The question/query from the user (e.g., the original task)
- Number of sub-actions performed so far along with a summary (for example, if the task Ti has triggered two actions successfully performed so far, critic engine 512 may provide a summary of all subtasks completed so far).
- A new subtask triggering feedback engine 514, along with the reasons why critic engine 512 prefers to stop the process.

In a simple embodiment, the SME request is a freeform text whereas, in a second embodiment, critic engine 512 may request help in the form of a series of potential options that the SME believes are relevant to successfully continue the process and solve the task at the end.

Finally, analytics engine 516 may be responsible for generating analytics regarding the operations of architecture 500. To this end, it may log all interactions between troubleshooting agent 502 and critic engine 512. In turn, analytics engine 516 may determine information such as any or all of the following, for review via user interface 518:

- For a task Ti, the number of times critic engine 512 reviewed the output of troubleshooting agent 502 and determined that the quality of the output was correct.
- For a task Ti, the number of times critic engine 512 reviewed the output of troubleshooting agent 502 and determined that the quality was not sufficient, the hint provided to troubleshooting agent 502 and percentage of times the output was sufficient after 1, 2, . . . iterations.
- For a task Ti, the number of times critic engine 512 reviewed the output of troubleshooting agent 502 and determined that SME feedback was required via feedback engine 514 (along with the percentage of time the SME provided an input that allow for successful completion of the task).

Figure 12:
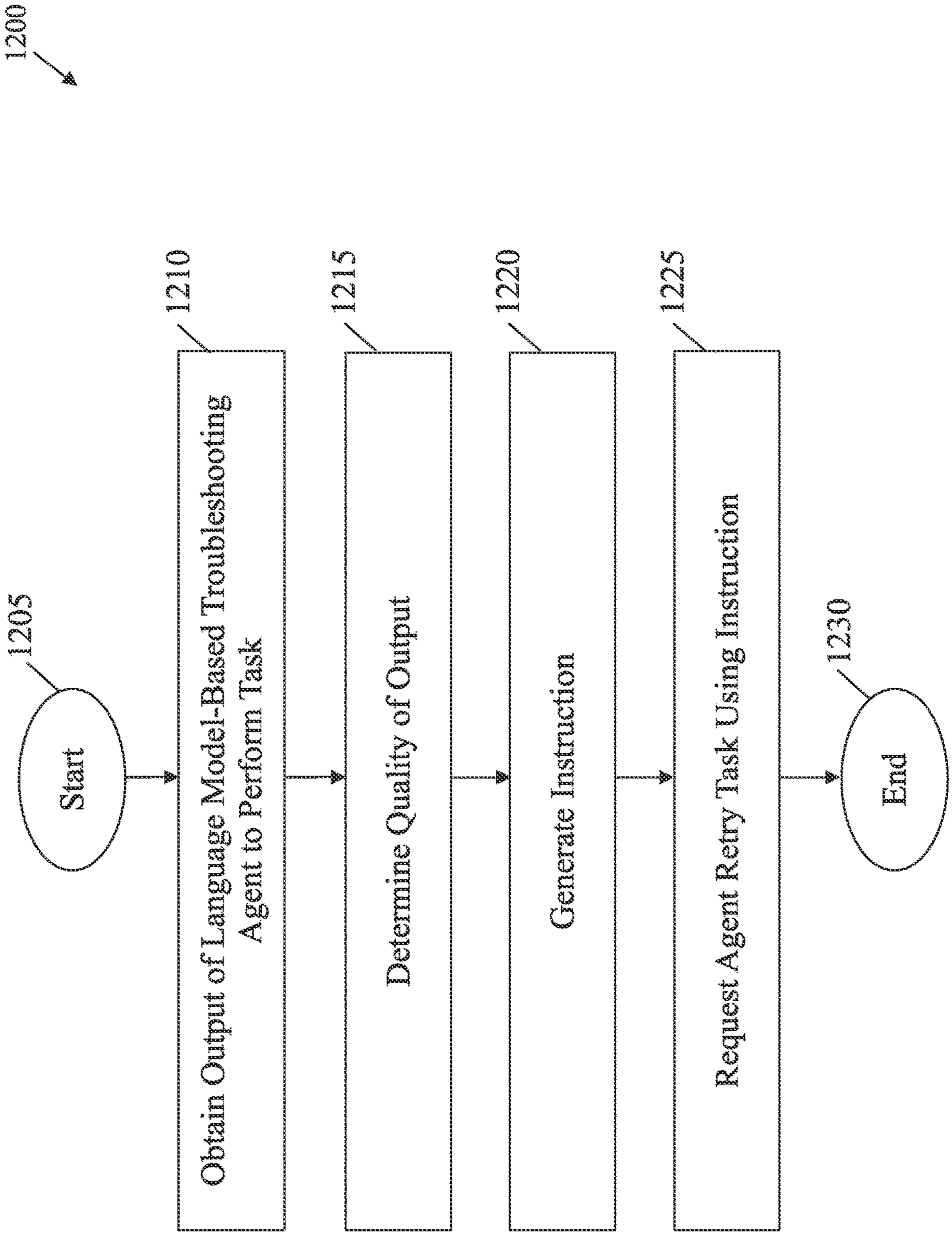
FIG. 12 illustrates an example simplified procedure for providing transparency in language model-based network troubleshooting systems.

FIG. 12 illustrates an example simplified procedure 1200 (e.g., a method) for providing transparency in language model-based network troubleshooting systems, in accordance with one or more implementations described herein. For example, a non-generic, specifically configured device (e.g., device 200), such as a router, firewall, controller for a network (e.g., an SDN controller or other device in communication therewith), server, or the like, may perform procedure 800 by executing stored instructions (e.g., agent control process 249 and/or network control process 248). The procedure 1200 may start at step 1205, and continues to step 1210, where, as described in greater detail above, the device may receive an output of a language model-based troubleshooting agent to perform a task with respect to a computer network. In some implementations, the language model-based troubleshooting agent uses a large language model to generate the output.

At step 1215, as detailed above, the device may determine a level of quality of the output. In various implementations, the device uses a different language model than that of the language model-based troubleshooting agent to determine the level of quality of the output. In another implementation, the device may determine the level of quality of the output by determining a confidence measure regarding whether the output will complete the task.

At step 1220, the device may generate an instruction for the language model-based troubleshooting agent, when the level of quality of the output is below a threshold, as described in greater detail above. In some cases, the device may do so by sending, to a user interface, a notification regarding the level of quality being below the threshold, to request the instruction from a user.

At step 1225, as detailed above, the device may request that the language model-based troubleshooting agent perform the task using the instruction. In some instances, the output comprises code for execution to perform the task, and wherein the instruction comprises alternate code for execution. In one instance, the alternate code when executed retrieves telemetry from networking equipment in the computer network. The device may also provide, to a user interface, an indication as to how many times the level of quality of the output of the language model-based troubleshooting agent to perform the task was below the threshold. The device may further provide the output of the language model-based troubleshooting agent and the instruction to a user interface for review by a user. In such a case, the device may also provide an outcome of the task to the user interface for review by the user.

Procedure 1200 then ends at step 1230.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations for providing transparency in language model-based network troubleshooting systems, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

receiving, at a device, an output of a language model-based troubleshooting agent to perform an intermediate step of a troubleshooting task with respect to a computer network;

determining, by the device, a level of quality of the output indicative of how well the output is expected to perform the intermediate step;

generating, by the device, an instruction for the language model-based troubleshooting agent, when the level of quality of the output is below a threshold, wherein generating the instruction comprises sending, by the device and to a user interface, a notification regarding the level of quality being below the threshold, to request the instruction from a user; and requesting, by the device, that the language model-based troubleshooting agent perform the troubleshooting task using the instruction.

2. The method as in claim 1, wherein the language model-based troubleshooting agent uses a large language model to generate the output.

3. The method as in claim 1, wherein the output comprises code for execution to perform the troubleshooting task, and wherein the instruction comprises alternate code for execution.

4. The method as in claim 3, wherein the alternate code when executed retrieves telemetry from networking equipment in the computer network.

5. The method as in claim 1, wherein the device uses a different language model than that of the language model-based troubleshooting agent to determine the level of quality of the output.

6. The method as in claim 1, wherein determining the level of quality of the output comprises:

determining, by the device, a confidence measure regarding whether the output will complete the troubleshooting task.

7. The method as in claim 1, further comprising:

providing, by the device and to the user interface, an indication as to how many times the level of quality of the output of the language model-based troubleshooting agent to perform the troubleshooting task was below the threshold.

8. The method as in claim 1, further comprising:

providing, by the device, the output of the language model-based troubleshooting agent and the instruction to the user interface for review by the user.

9. The method as in claim 8, further comprising:

providing, by the device, an outcome of the troubleshooting task to the user interface for review by the user.

10. An apparatus, comprising:

one or more network interfaces;

a processor coupled to the one or more network interfaces and configured to execute one or more processes; and a memory configured to store a process that is executable by the processor, the process when executed configured to:

receive an output of a language model-based troubleshooting agent to perform an intermediate step of a troubleshooting task with respect to a computer network;

determine a level of quality of the output indicative of how well the output is expected to perform the intermediate step;

generate an instruction for the language model-based troubleshooting agent, when the level of quality of the output is below a threshold, wherein the apparatus generates the instruction by sending, to a user interface, a notification regarding the level of quality being below the threshold, to request the instruction from a user; and request that the language model-based troubleshooting agent perform the troubleshooting task using the instruction.

11. The apparatus as in claim 10, wherein the apparatus determines the level of quality of the output by:

determining a confidence measure regarding whether the output will complete the troubleshooting task.

12. The apparatus as in claim 10, wherein the language model-based troubleshooting agent uses a large language model to generate the output.

13. The apparatus as in claim 10, wherein the output comprises code for execution to perform the troubleshooting task, and wherein the instruction comprises alternate code for execution.

14. The apparatus as in claim 13, wherein the alternate code when executed retrieves telemetry from networking equipment in the computer network.

15. The apparatus as in claim 10, wherein the apparatus uses a different language model than that of the language model-based troubleshooting agent to determine the level of quality of the output.

16. The apparatus as in claim 10, wherein the process when executed is further configured to:

provide the output of the language model-based troubleshooting agent and the instruction to the user interface for review by the user.

17. The apparatus as in claim 10, wherein the process when executed is further configured to:

provide, to the user interface, an indication as to how many times the level of quality of the output of the language model-based troubleshooting agent to perform the troubleshooting task was below the threshold.

18. A tangible, non-transitory, computer-readable medium storing program instructions that cause a device to execute a process comprising:

receiving, at the device, an output of a language model-based troubleshooting agent to perform an intermediate step of a troubleshooting task with respect to a computer network;

determining, by the device, a level of quality of the output indicative of how well the output is expected to perform the intermediate step;

generating, by the device, an instruction for the language model-based troubleshooting agent, when the level of quality of the output is below a threshold;

requesting, by the device, that the language model-based troubleshooting agent perform the troubleshooting task using the instruction; and providing, by the device and to a user interface, an indication as to how many times the level of quality of the output of the language model-based troubleshooting agent to perform the troubleshooting task was below the threshold.

19. The tangible, non-transitory, computer-readable medium as in claim 18, wherein the device uses a different language model than that of the language model-based troubleshooting agent to determine the level of quality of the output.

20. The tangible, non-transitory, computer-readable medium as in claim 18, wherein the output comprises code for execution to perform the troubleshooting task, and wherein the instruction comprises alternate code for execution.

* * * * *